(12) United States Patent
Smith et al.

(10) Patent No.: US 7,661,017 B2
(45) Date of Patent: Feb. 9, 2010

(54) DIAGNOSTIC OPERATIONS WITHIN A SWITCHED FIBRE CHANNEL ARBITRATED LOOP SYSTEM

(75) Inventors: Donald Scott Smith, Tucson, AZ (US);
Brian James Cagno, Tucson, AZ (US);
Kenny Nian Gan Qiu, Tucson, AZ (US)

(73) Assignee: International Business Machines Corporaion, Armonk, NY (US)

( * ) Notice: Subject to any disclaimer, the term of this patent is extended or adjusted under 35 U.S.C. 154(b) by 403 days.

(21) Appl. No.: 11/668,879

(22) Filed: Jan. 30, 2007

(65) Prior Publication Data
US 2008/0184074 A1 Jul. 31, 2008

(51) Int. Cl.
G06F 11/00 (2006.01)
(52) U.S. Cl. ......................................................... 714/5
(58) Field of Classification Search .................. 714/2–8, 714/13, 15, 20, 37, 38, 42, 43, 54
See application file for complete search history.

(56) References Cited

U.S. PATENT DOCUMENTS

| | | | |
|---|---|---|---|
| 5,975,738 A | 11/1999 | DeKoning et al. | |
| 6,681,342 B2 | 1/2004 | Johnson et al. | |
| 6,684,266 B2 * | 1/2004 | Faber et al. | 710/20 |
| 6,766,466 B1 * | 7/2004 | Jibbe | 714/4 |
| 6,909,993 B2 | 6/2005 | Nakao et al. | |
| 6,990,609 B2 | 1/2006 | Wiley et al. | |
| 7,003,688 B1 * | 2/2006 | Pittelkow et al. | 714/7 |
| 7,036,042 B1 * | 4/2006 | Nguyen | 714/7 |
| 7,047,450 B2 | 5/2006 | Iwamitsu et al. | |
| 7,055,068 B2 | 5/2006 | Riedl | |
| 7,058,844 B2 | 6/2006 | Wiley et al. | |
| 7,065,672 B2 | 6/2006 | Long et al. | |
| 7,127,633 B1 * | 10/2006 | Olson et al. | 714/4 |
| 7,146,521 B1 * | 12/2006 | Nguyen | 714/2 |
| 7,506,039 B2 * | 3/2009 | Hammons et al. | 709/223 |
| 2002/0133736 A1 * | 9/2002 | Faber et al. | 714/5 |
| 2004/0088396 A1 * | 5/2004 | Hammons et al. | 709/223 |
| 2004/0143682 A1 * | 7/2004 | Valdevit | 709/250 |

OTHER PUBLICATIONS

"InSpeed SOC 422 Embedded Storage Switch", EMULEX, Jan. 2004, pp. 1-4, [retrieved online Sep. 27, 2006], http://www.emulex.com/products/fcswitch/422/422.pdf.
"FibreChannel", Wikipedia, pp. 1-5, [retrieved online Sep. 27, 2006], http://en.wikipedia.org/wiki/Fibre_Channel.

* cited by examiner

*Primary Examiner*—Nadeem Iqbal
(74) *Attorney, Agent, or Firm*—Rabindranath Dutta; Konrad Raynes & Victor LLP

(57) ABSTRACT

Provided are a method, system, and article of manufacture wherein at least a first zone is maintained in a fibre channel arbitrated loop system, and wherein a plurality of storage devices is included in the first zone. A determination is made that diagnostic operations have to be performed on a storage device that is included in the plurality of storage devices. A second zone is generated, wherein the second zone includes the storage device on which the diagnostic operations have to be performed, and wherein the storage device is removed from the plurality of storage devices in the first zone leaving a remaining set of storage devices in the first zone. Diagnostic operations are performed on the storage device in the second zone while other operations are performed on the remaining set of storage devices in the first zone.

16 Claims, 5 Drawing Sheets

DIAGNOSTIC OPERATIONS WITHIN A SWITCHED FIBRE CHANNEL ARBITRATED LOOP SYSTEM

BACKGROUND

1. Field

The disclosure relates to a method, system, and article of manufacture for performing diagnostic operations within a switched fibre channel arbitrated loop system.

2. Background

Fibre Channel is gigabit-speed network technology that may be used for storage networking. In an enterprise or midrange class storage subsystem, the storage devices, such as disk drives, may be arranged as part of a fibre channel arbitrated loop (FCAL) system. This FCAL system allows communication to a set of drives [also referred to as Just a Bunch Of Disks (JBOD)] using the Fibre Channel (FC) interface protocol without having to create a FC fabric, which is expensive and complex to create. In a JBOD configuration the disks are daisy chained together such that all data travels through all drives. As a result when a drive has a problem, it can cause repeated loop configurations and subsequently a loss of access to the entire loop of disks, disrupting the normal flow of Input/Output (I/O) traffic to the disk system.

With the advent and usage of the FCAL switch, thus creating a set of switched drives [also referred to as Switched Branch Of Disks (SBOD)], the above problem can be alleviated to some extent. In a SBOD configuration the disks are connected in a star topology allowing better isolation of problems with disks. Certain FCAL switches can be configured to run a limited diagnostic test before allowing a target drive to be inserted on to the main FCAL loop. This diagnostic, though effective, is primarily a FCAL primitive diagnostic, only testing level-0 FCAL interface operations, such as, testing for signal, synchronization, and successful communications of low level FC ordered sets. Drives can fail across the complete range of FC interface operation level-0 through level 4.

SUMMARY OF THE PREFERRED EMBODIMENTS

Provided are a method system, and article of manufacture wherein at least a first zone is maintained in a fibre channel arbitrated loop system, and wherein a plurality of storage devices is included in the first zone. A determination is made that diagnostic operations have to be performed on a storage device that is included in the plurality of storage devices. A second zone is generated, wherein the second zone includes the storage device on which the diagnostic operations have to be performed, and wherein the storage device is removed from the plurality of storage devices in the first zone leaving a remaining set of storage devices in the first zone.

In further embodiments, the storage device in the second zone is a first storage device, wherein the remaining set of storage devices in the first zone includes a second storage device. A local processor coupled to the first storage device is maintained in the second zone and a second storage device coupled to the local processor is maintained in the first zone. The diagnostic operations are performed on the first storage device via the local processor. Selected operations from the other operations are performed on the second storage device via the local processor.

In still further embodiments, the first zone and the second zone include a fibre channel arbitrated loop switch that allow fibre channel zoning, wherein the fibre channel zoning permits the fibre channel arbitrated loop switch to be a member of at least two overlapping fibre channel zones.

In additional embodiments, the fibre channel arbitrated loop system is comprised of a host system, a storage controller in communication with the host system, a plurality of fibre channel arbitrated loop switches in communication with the storage controller, wherein the plurality of storage devices are coupled to the plurality of fibre channel arbitrated loop switches, and a plurality of local processors is coupled to the plurality of fibre channel arbitrated loop switches, wherein at least one local processor communicates with at least one storage device via at least one fibre channel arbitrate loop switch that couples the at least one local processor to the at least one storage device.

The yet additional embodiments, the plurality of storage devices is configured to be in a loop in the fibre channel arbitrated loop system, and wherein if the second zone is not generated then performing the diagnostics operations on the storage device while the storage device is included in the first zone causes a greater performance impact on the other operations in comparison to the performing of the diagnostic operations on the storage device in the second zone.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrte several embodiments. It is understood that other embodiments may be utilized and structural and operational changes may be made.

Certain embodiments use both the local microprocessor in each SBOD (currently used only to initialize the FCAL switch) and the expanded 'FC zoning' function of FCAL switches, to create a FC diagnostic zone around a problematic drive and the FC port on the FCAL loop that is under the control of the local processor. This diagnostic zone can then be utilized to run drive diagnostics, without the concerns of the problematic drive causing continual disruption of the main FCAL loop or causing a performance impact of running a diagnostic inband with normal I/O operation to the SBOD.

Figure 1:
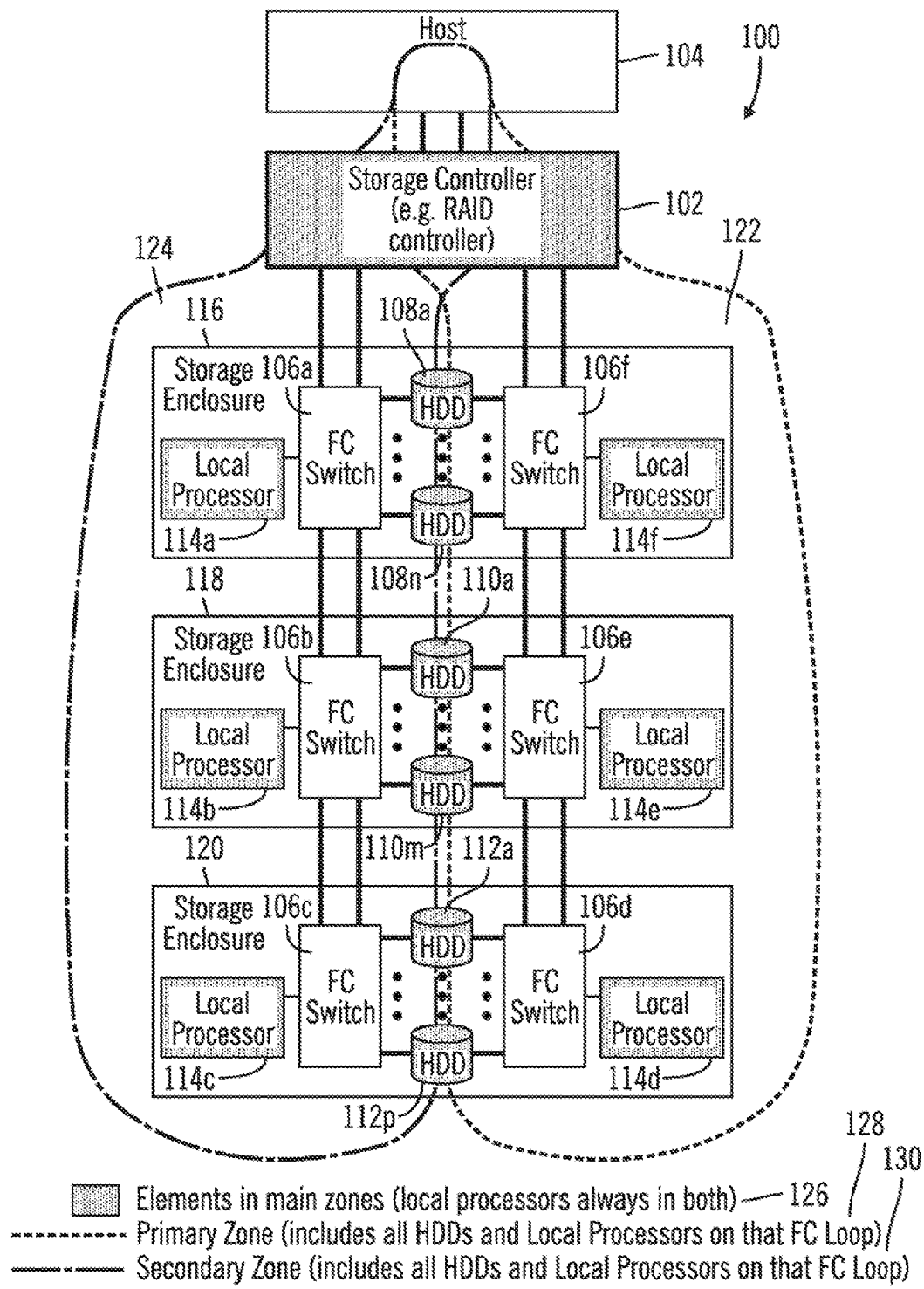
FIG. 1 illustrated a block diagram of a first computing environment in which diagnostic zones can be created, in accordance with certain embodiments.

FIG. 1 illustrates a block diagram of a first computing environment 100 also referred to a FCAL system 100, in accordance with certain embodiments. Diagnostic zones can be created in the FCAL system 100.

The FCAL system 100 comprises a storage controller 102 in communication with a host system 104. A plurality of fibre channel arbitrated loop switches, also referred to as FC switches 106a, 106b, 106c, 106d, 106e, 106f may be in communication with the storage controller 102, wherein a plurality of dual-port storage devices 108a . . . 108n, 110a . . . 110m, 112a . . . 112p, such as dual-port hard disk drives (HDD), are coupled to the plurality of fibre channel arbitrated loop switches 106a, 106b, 106c, 106d, 106e, 106f. While only six fibre channel arbitrated loop switches have been shown in FIG. 1, in alternative embodiments a greater or a fewer number of fibre channel arbitrated loop switches may be present. The fibre channel arbitrated loop switches 106a, 106b, 106c, 106d, 106e, 106f allow fibre channel zoning, wherein fibre channel zoning permits a fibre channel arbitrated loop switch to be a member of at least two overlapping fibre channel zones.

A plurality of local processors 114a, 114b, 114c, 114d, 114e, 114f are coupled to the plurality of fibre channel arbitrated loop switches 106a, 106b, 106c, 106d, 106e, 106f. A local processor may communicate with one or more storage devices via at least one fibre channel arbitrated loop switch that couples the local processor to the one or more storage devices. For example, the local processor 114e communicates with the storage devices 110a . . . 110m via the fibre channel arbitrated loop switch 106e.

In certain embodiments, the local processors 114a, 114f, the storage devices 108a . . . 108n, and the fibre channel arbitrated loop switches 106a,106f may be included in a storage enclosure 116, whereas the local processors 114b, 114e, the storage devices 110a . . . 110m, and the fibre channel arbitrated loop switches 106b, 106e may be included in a storage enclosure 118. Furthermore, the local processors 114c, 114d, the storage devices 112a . . . 112p, and the fibre channel arbitrated loop switches 106c, 106d may be included in a storage enclosure 120.

In certain embodiments, the FCAL system 100 is an SBOD storage subsystem that provides redundant FCAL loop access to the dual-port storage devices 108a . . . 108n, 110a . . . 110m, 112a . . . 112p. The FCAL system 100 can be configured to include a primary zone 122 (also indicated in the legend via reference numeral 128) and a secondary zone 124 (also indicated in the legend via reference numeral 130), wherein the primary zone 122 and the secondary zone 124 provide redundant FCAL loop access to the dual-port storage devices 108a . . . 108n, 110a . . . 110m, 112a . . . 112p. The storage controller 102, the local processors 114a . . . 114f, and the dual-port storage devices 108a . . . 108n, 110a . . . 110m, 112a . . . 112p may be part of a main zone configured in the FCAL system 100 (certain elements of the main zone are indicated in the legend via reference numeral 126) in addition to the FC switches 106a . . . 106f included in the main zone, whereas the primary zone 122 includes storage devices, FC switches 106d, 106e, 106f and local processors 114d, 114e, 114f in the FC loop corresponding to the primary zone 122 and the secondary zone 124 includes storage devices, FC switches 106a, 106b, 106c, and the local processors 114a, 114b, 114c in the FC loop corresponding to the secondary zone 124. Local processors may be found in both the primary zone 122 and the secondary zone 124, and the legend denoted by reference numeral 126 in FIG. 1 indicates the presence of local processors in both the primary zone 122 and the secondary zone 124 by indicating that "local processors" are "always in both". For example, local processors 114d, 114e, 114f may be found in the primary zone 122 and local processors 114a, 114b, 114c may be found in the secondary zone 124.

A local processor is used to perform initial set up of a FC switch as well as provide the FC switch with a processing platform to help control the operation of the FC switch. For example, the local processor 114a may be used to perform the initial setup of the FC switch 106a.

A local processor also has an interface port to the FC loop to provide a communication path between the storage controller 102 and any storage enclosure's local processor. Using this same interface port the local processor could also communicate directly to the storage devices if necessary, becoming an FC initiator to the targets (storage devices) on the FCAL loop. The FC switches 106a . . . 106f can also be set up to create multiple FCAL loops or zones within a given switch or set of switches, each FCAL loop having defined set of initiators and targets. For example, in FIG. 1, the FC switches 106a . . . 106f have been set up to create a primary zone 122 and a secondary zone 124.

Figure 2:
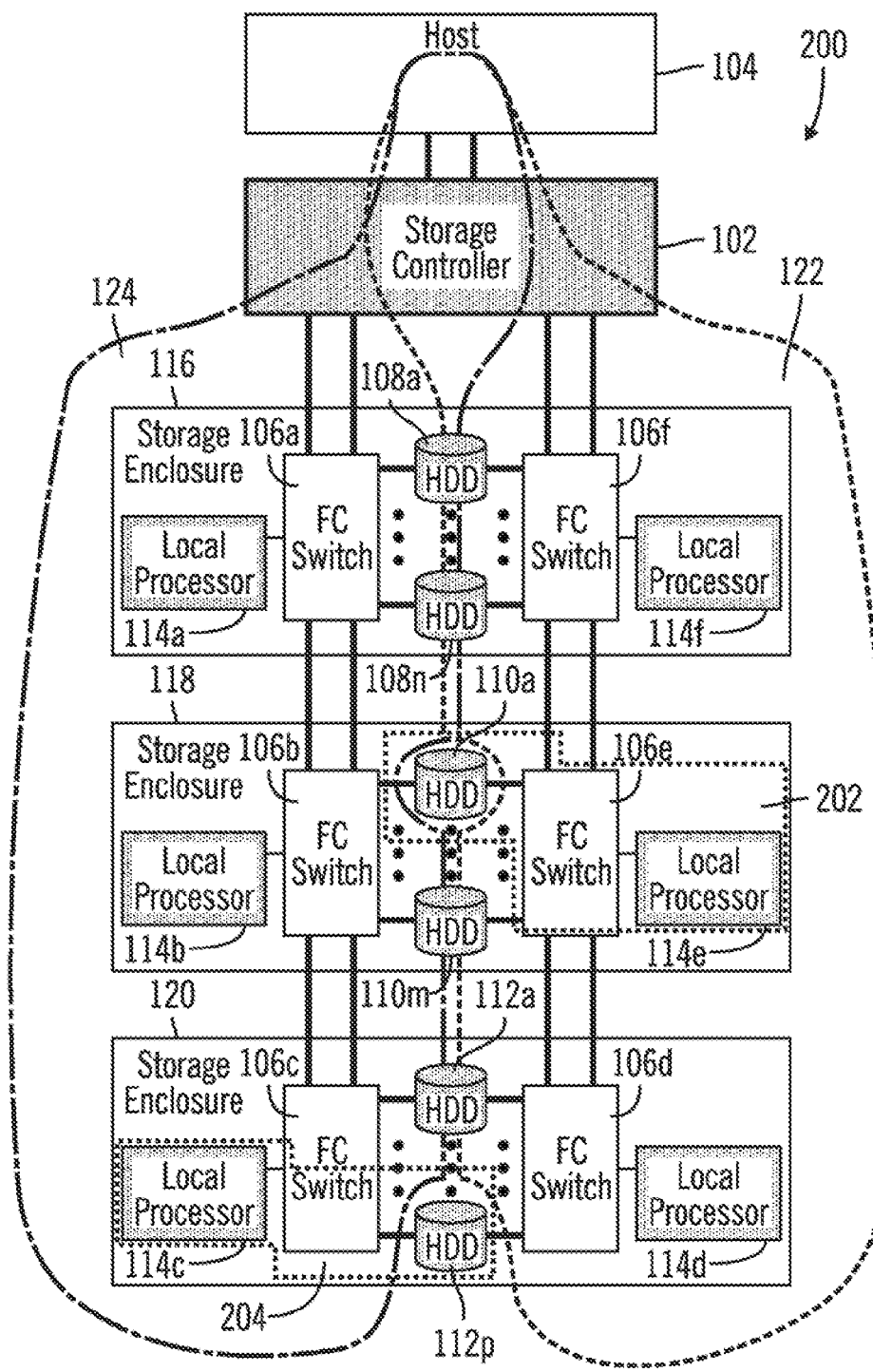
FIG. 2 illustrates a block diagram of a second computing environment with diagnostic zones, in accordance with certain embodiments.

FIG. 2 illustrates a block diagram of a second computing environment 200, also referred to as a FCAL system 200, in accordance with certain embodiments. The second computing environment 200 includes the same elements as the computing environment 100 but the elements are configured differently. The second computing environment 200 shows diagnostic zones 202, 204 that have been configured to resolve problems with storage devices 110a, 112p.

If a storage device has problems, the mechanism which sensed the problem with the storage device fibre channel arbitrated loop could communicate to the appropriate storage enclosure's local processor to reconfigure the FC switch into a plurality of zones. This plurality of zones would include a main zone comprising the normal FCAL loop with all its appropriate initiators, local processor FC ports and target storage devices (excluding the problematic target storage device) and a new diagnostic zone comprising the appropriate local processor's FC port and the problematic target drive port. This separate diagnostic zone isolates the problematic drive from the main zone that includes the rest of the storage devices and initiators on the FCAL loop.

Since one of the features in the zoning function of the FC switch that can be used as the FC switches 106a . . . 106f is the concept of overlapping zones, the local processor FC port can be a part of multiple zones, thus allowing for its creation and participation in the newly created diagnostic zone as well as maintaining its presence on the main zone, the main FCAL loop, ensuring non-disruptive, normal FCAL loop operation. Any suitable FC switch (e.g., SOC 422 from the Emulex* Corp.) that can support overlapping zones may be used as the FC switches 106a . . . 106f.

In FIG. 2, two diagnostic zones 202 and 204 are shown. Diagnostic zone 202 has been created to isolate problems with storage device 110a, whereas diagnostic zone 204 has been created to isolate problems with storage device 112p. Thus FIG. 2 shows how a diagnostic zone 202 has been created to overlap wit zone 122, and how diagnostic zone 204 has been created to overlap with zone 124, where zones 122, 124 may also be referred to as main zones in the computing environment 200. It should be noted that zones 122 and zone 124 were referred to as primary and secondary zones respectively in FIG. 1 in the computing environment 100.

Therefore, FIG. 2 illustrates certain embodiments in which diagnostic zones are created within main zones to isolate problems with storage devices in a fibre channel arbitrated loop system.

Figure 3:
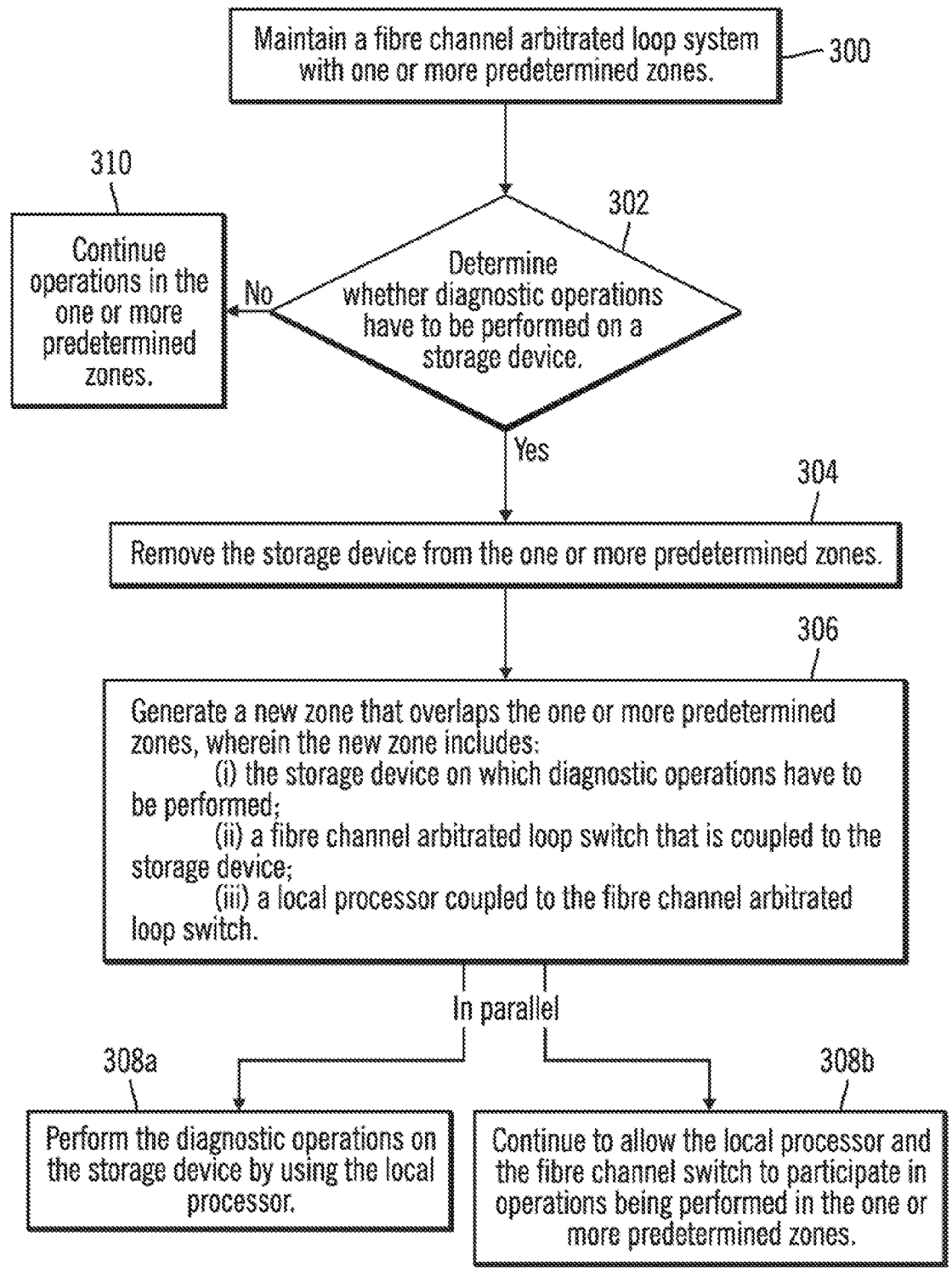
FIG. 3 illustrates a first set of operations for creating diagnostic zones, in accordance with certain embodiments.

FIG. 3 illustrates a first set of operations for creating one or more diagnostic zones, in accordance with certain embodiments. The first set of operations may be implemented in the computing environment 100 or the computing environment 200.

Control starts at block 300, wherein a fibre channel arbitrated loop system 200 is maintained with one or more predetermined zones 122, 124. Control proceeds to block 302, where a determination is made as to whether diagnostic operations have to be performed on a storage device, such as storage device 110a. If so, then the storage device 110a is removed (at block 304) from the predetermined zone 122.

Control proceeds to block 306 where a new zone 202, also referred to as a diagnostic zone 202, is generated, wherein the new zone 202 overlaps the predetermined zone 122, wherein the new zone includes: (i) the storage device 110a on which diagnostic operations have to be performed; (ii) a fibre channel arbitrated loop switch 106e that is coupled to the storage device 110a; and (iii) a local processor 114e that is coupled to the fibre channel arbitrated loop switch 106e.

Control proceeds in parallel to block 308a and 308b from block 306. The diagnostic operations are performed (at block 308) on the storage device 110a by using the local processor 114e. The local processor 114e and the fibre channel arbitrated loop switch 106e are allowed to continue to participate in operations being performed in the predetermined zones 122.

If at block 302 a determination is made that no diagnostic operations have to be performed on a storage device, control proceeds to block 310 where the system continues to perform operations in the one or more predetermined zones 122, 124 before control is returned to block 302.

Therefore, FIG. 3 illustrates certain embodiments in which in response to diagnostic operations being required on one or more storage devices 110a, 112p, diagnostic zones 202, 204 may be created, wherein the diagnostic zones 202, 204 overlap predetermined zones 122, 124 in the fibre channel arbitrated loop system 200.

Figure 4:
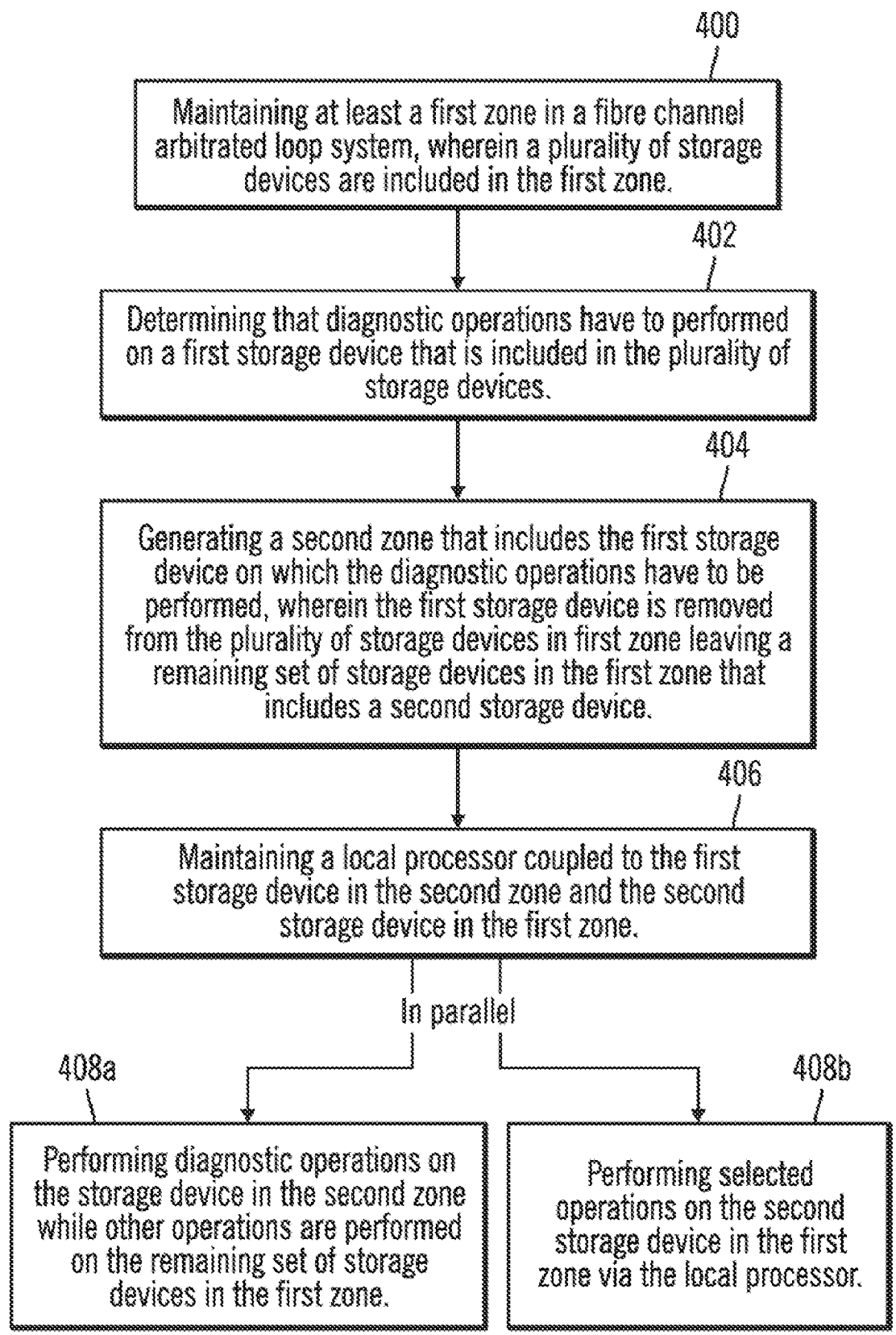
FIG. 4 illustrates second set of operations for creating diagnostic zones, in accordance with certain embodiments.

FIG. 4 illustrates second set of operations for creating one or more diagnostic zones, in accordance with certain embodiments. The second set of operations may be implemented in the computing environment 100 or the computing environment 200.

Control starts at block 400, wherein at least a first zone 122 in a fibre channel arbitrated loop system 200 is maintained, wherein a plurality of storage devices 108a . . . 108n, 110a . . . 110m, 112a . . . 112p are included in the first zone 122.

A determination is made (at block 402) that diagnostic operations have to performed on a first storage device 110a that is included in the plurality of storage devices 108a . . . 108n, 110a . . . 110m, 112a . . . 112p.

A second zone 202 that includes the first storage device 110a on which the diagnostic operations have to be performed is generated (at block 404), wherein the first storage device 110a is removed from the plurality of storage devices in first zone 122 leaving a remaining set of storage devices in the first zone 122 that includes a second storage device 110m.

Control proceeds to block 406, wherein a local processor 114e is coupled to the first storage device 110a in the second zone 202 and the second storage device 110m in the first zone 122. From block 406 control proceeds in parallel to block 408a and 408b.

At block 408a, diagnostic operations are performed on the first storage device 110a in the second zone 202 while other operations are performed on the remaining set of storage devices in the first zone 122. At block 408b, selected operations are performed on the second storage device 110m in the first zone via the local processor 114e.

The local processor 114e can run a comprehensive set of appropriate diagnostics to the problematic storage device within the newly created diagnostic zone. Such a set of appropriate diagnostics could include:

(1) execution of more FC primitives;
(2) separate execution of loop configurations; and
(3) execution of a set of FC extended link services (ELS) including I/O and other Small Computer Systems Interface (SCSI) operations.

Once the diagnostic is complete and based on its results, the local processor could make the termination to either:
1) maintain the diagnostic zone through the repair/replace action of the problematic storage device, and subsequently running a diagnostic on the new storage device to verify the repair/replace action; and
2) dissolve the diagnostic zone and allow the storage device in question, either the original which passes the diagnostic or a new drive which passes the diagnostic, back on to the main FCAL loop.

Therefore, FIG. 4 illustrates certain embodiments in which in response to diagnostic operations being required on a storage device 110a, a diagnostic zone is created, wherein the diagnostic zone 202 overlaps the previously defined zone 122 in the fibre channel arbitrated loop system 200. The storage drive 110a is removed from the previously defined zone 122.

In certain embodiments, the plurality of storage device are configured to be in a loop in the fibre channel arbitrated loop system 200, and wherein if the second zone 202 is not generated then performing the diagnostics operations on the storage device 110a while the storage device 110a is included in the first zone 122 causes a greater performance impact on the other operations in comparison to the performing of the diagnostic operations on the storage device 110a in the second zone 202.

Certain embodiments allow the execution of a set of FC drive diagnostics without either the problematic drive causing FCAL loop disruption or the siphoning of bandwidth from the FCAL system needed for normal high performance I/O operation.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), State Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components to which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system for apparatus or device) or a propagation medium. Examples of a computer readable medium include a semiconductor or solid state memory, magnetic tape, a removable computer diskette, a random access memory (RAM), a read-only (ROM), a rigid magnetic disk and an optical disk. Current examples of optical disks include compact disk—read only memory (CD-ROM), compact disk—read/write (CD-R/W) and DVD.

The terms "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessary indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. This, other embodiments need not include the device itself.

Figure 5:
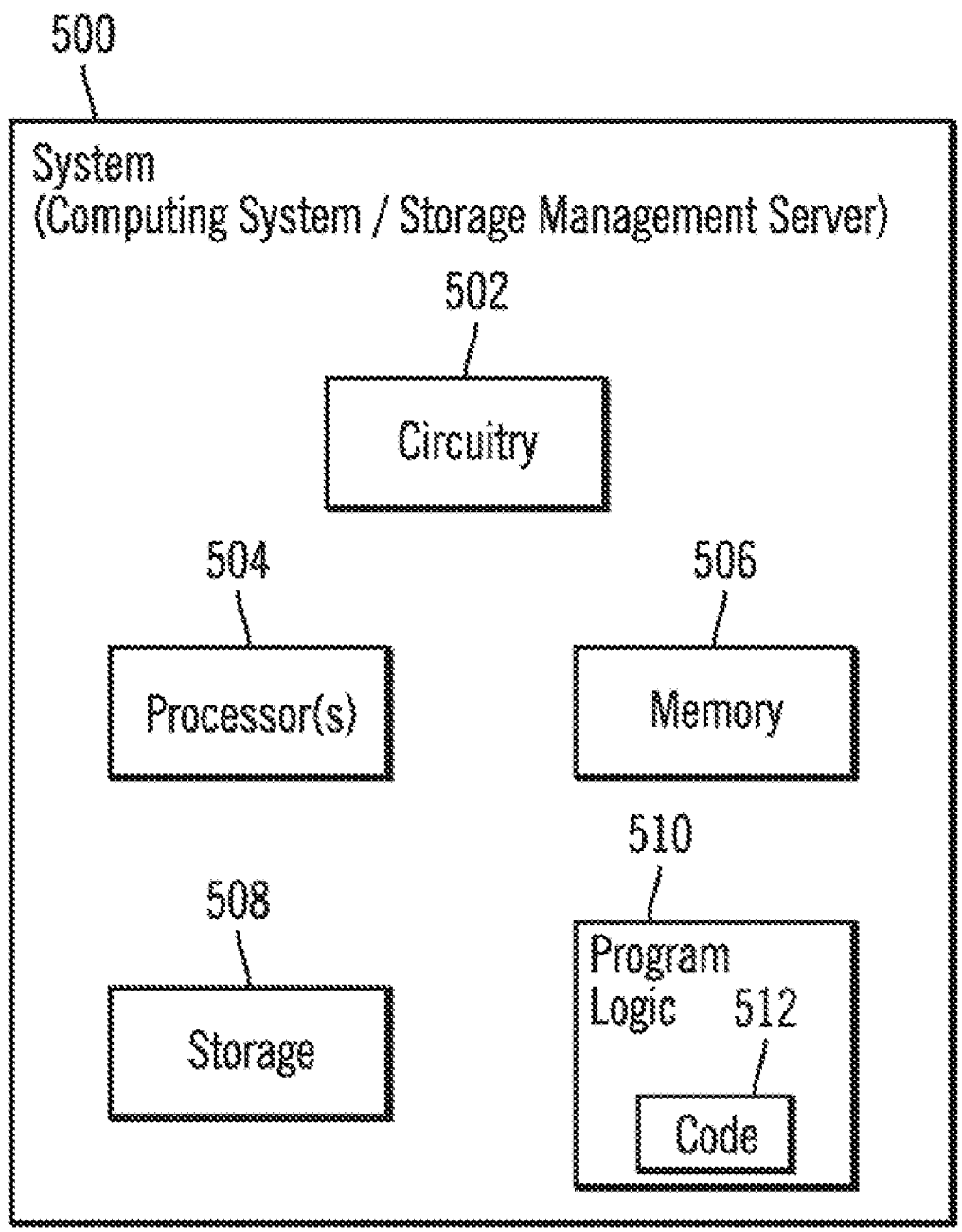
FIG. 5 illustrates a block diagram of a computer architecture in which certain described embodiments are implemented.

FIG. 5 illustrates the architecture of computing system 500, wherein in certain embodiments the host 104, the storage controller 102, and the storage enclosures 116, 118, 120 of the computing environment 100, 200 of FIGS. 1 and 2 may be implemented in accordance with the architecture of the computing system 500. The computing system 500 may also be referred to as a system, and may include a circuitry 502 that may in certain embodiments include a processor 504. The system 500 may also include a memory 500 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 500 may include a program logic 510 including code 512 that may be loaded into the memory 506 and executed by the processor 504 or circuitry 502. In certain embodiments, the program logic 510 including code 512 may be stored in the storage 508. In certain other embodiments, the program logic 510 may be implemented in the circuitry 502. Therefore, while FIG. 5 shows the program logic 510 separately from the other elements, the program logic 510 may be implemented in the memory 506 and/or the circuitry 502.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-5 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-5 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exclusive or to limit the embodiments to the precise form disclosed. Many modifications and variations are possible in light of the above teaching.

What is claimed is:

1. A method, comprising:
   maintaining at least a first zone in a fibre channel arbitrated loop system, wherein a plurality of storage devices is included in the first zone;

determining that diagnostic operations have to be performed on a storage device that is included in the plurality of storage devices;

generating a second zone that includes the storage device on which the diagnostic operations have to be performed, wherein the storage device is removed from the plurality of storage devices in the first zone leaving a remaining set of storage devices in the first zone; and performing diagnostic operations on the storage device in the second zone while other operations are performed on the remaining set of storage devices in the first zone, wherein the fibre channel arbitrated loop system is comprised of:

a host system;

a storage controller in communication with the host system;

a plurality of fibre channel arbitrated loop switches in communication with the storage controller, wherein the plurality of storage devices is coupled to the plurality of fibre channel arbitrated loop switches; and a plurality of local processors coupled to the plurality of fibre channel arbitrated loop switches, wherein at least one local processor communicates with at least one storage device via at least one fibre channel arbitrate loop switch that couples the at least one local processor to the at least one storage device.

2. The method of claim 1, wherein the storage device in the second zone is a first storage device, wherein the remaining set of storage devices in the first zone includes a second storage device, the method further comprising:

maintaining a local processor of the plurality of local processors coupled to the first storage device in the second zone and a second storage device in the first zone;

performing the diagnostic operations on the first storage device via the local processor; and performing selected operations from the other operations on the second storage device via the local processor.

3. The method of claim 1, wherein the first zone and the second zone include a fibre channel arbitrated loop switch that allows fibre channel zoning, wherein the fibre channel zoning permits the fibre channel arbitrated loop switch to be a member of at least two overlapping fibre channel zones.

4. The method of claim 1, wherein the plurality of storage devices are configured to be in a loop in the fibre channel arbitrated loop system.

5. A fibre channel arbitrated loop system, comprising:

a memory;

a plurality of storage devices coupled to the memory; and processor coupled to the memory, wherein the processor performs operations, the operations comprising:

(i) maintaining at least a first zone in the fibre channel arbitrated loop system, wherein the plurality of storage devices is included in the first zone;

(ii) determining that diagnostic operations have to be performed on a storage device that is included in the plurality of storage devices;

(iii) generating a second zone that includes the storage device on which the diagnostic operations have to be performed, wherein the storage device is removed from the plurality of storage devices in the first zone leaving a remaining set of storage devices in the first zone; and (iv) performing diagnostic operations on the storage device in the second zone while other operations are performed on the remaining set of storage devices in the first zone, wherein the fibre channel arbitrated loop system further comprises:

a host system;

a storage controller in communication with the host system;

a plurality of fibre channel arbitrated loop switches in communication with the storage controller, wherein the plurality of storage devices is coupled to the plurality of fibre channel arbitrated loop switches; and a plurality of local processors coupled to the plurality of fibre channel arbitrated loop switches, wherein at least one local processor communicates with at least one storage device via at least one fibre channel arbitrate loop switch that couples the at least one local processor to the at least one storage device.

6. The fibre channel arbitrated loop system of claim 5, wherein the storage device in the second zone is a first storage device, wherein the remaining set of storage devices in the first zone includes a second storage device, the fibre channel arbitrated loop system further comprising:

a local processor of the plurality of local processors coupled to the first storage device in the second zone and a second storage device in the first zone, wherein the diagnostic operations are performed on the first storage device via the local processor, and wherein selected operations from the other operations on the second storage device via the local processor.

7. The fibre channel arbitrated loop system of claim 5, wherein the first zone and the second zone include a fibre channel arbitrated loop switch that allows fibre channel zoning, wherein the fibre channel zoning permits the fibre channel arbitrated loop switch to be a member of at least two overlapping fibre channel zones.

8. The fibre channel arbitrated loop system of claim 5, wherein the plurality of storage devices are configured to be in a loop in the fibre channel arbitrated loop system.

9. An article of manufacture, wherein the article of manufacture performs operations on a computer, the operations comprising:

maintaining at least a first zone in a fibre channel arbitrated loop system, wherein a plurality of storage devices is included in the first zone;

determining that diagnostic operations have to be performed on a storage device that is included in the plurality of storage devices;

generating a second zone that includes the storage device on which the diagnostic operations have to be performed, wherein the storage device is removed from the plurality of storage devices in the first zone leaving a remaining set of storage devices in the first zone; and performing diagnostic operations on the storage device in the second zone while other operations are performed on the remaining set of storage devices in the first zone, wherein the fibre channel arbitrated loop system is comprised of:

a host system;

a storage controller in communication with the host system;

a plurality of fibre channel arbitrated loop switches in communication with the storage controller, wherein the plurality of storage devices is coupled to the plurality of fibre channel arbitrated loop switches; and a plurality of local processors coupled to the plurality of fibre channel arbitrated loop switches, wherein at least one local processor communicates with at least one storage device via at least one fibre channel arbitrate loop switch that couples the at least one local processor to the at least one storage device.

10. The article of manufacture of claim 9, wherein the storage device in the second zone is a first storage device, wherein the remaining set of storage devices in the first zone includes a second storage device, the operations farther comprising:
- maintaining a local processor of the plurality of local processors coupled to the first storage device in the second zone and a second storage device in the first zone;
- performing the diagnostic operations on the first storage device via the local processor; and
- performing selected operations from the other operations on the second storage device via the local processor.

11. The article of manufacture of claim 9, wherein the first zone and the second zone include a fibre channel arbitrated loop switch that allows fibre channel zoning, wherein the fibre channel zoning permits the fibre channel arbitrated loop switch to be a member of at least two overlapping fibre channel zones.

12. The article of manufacture of claim 9, wherein the plurality of storage devices are configured to be in a loop in the fibre channel arbitrated loop system.

13. A method for deploying computing infrastructure, comprising integrating computer-readable code stored in a tangible storage medium into a computer, wherein the code in combination with the computer is capable of performing:
- maintaining at least a first zone in a fibre channel arbitrated loop system, wherein a plurality of storage devices is included in the first zone;
- determining that diagnostic operations have to be performed on a storage device that is included in the plurality of storage devices;
- generating a second zone that includes the storage device on which the diagnostic operations have to be performed, wherein the storage device is removed from the plurality of storage devices in the first zone leaving a remaining set of storage devices in the first zone; and
- performing diagnostic operations on the storage device in the second zone while other operations are performed on the remaining set of storage devices in the first zone, wherein the fibre channel arbitrated loop system is comprised of:
  - a host system;
  - a storage controller in communication with the host system;
  - a plurality of fibre channel arbitrated loop switches in communication with the storage controller, wherein the plurality of storage devices is coupled to the plurality of fibre channel arbitrated loop switches; and
  - a plurality of local processors coupled to the plurality of fibre channel arbitrated loop switches, wherein at least one local processor communicates with at least one storage device via at least one fibre channel arbitrate loop switch that couples the at least one local processor to the at least one storage device.

14. The method for deploying computing infrastructure of claim 13, wherein the storage device in the second zone is a first storage device, wherein the remaining set of storage devices in the first zone includes a second storage device, wherein the code in combination with the computer is further capable of performing:
- maintaining a local processor of the plurality of local processors coupled to the first storage device in the second zone and a second storage device in the first zone;
- performing the diagnostic operations on the first storage device via the local processor; and
- performing selected operations from the other operations on the second storage device via the local processor.

15. The method for deploying computing infrastructure of claim 13, wherein the first zone and the second zone include a fibre channel arbitrated loop switch that allows fibre channel zoning, wherein the fibre channel zoning permits the fibre channel arbitrated loop switch to be a member of at least two overlapping fibre channel zones.

16. The method for deploying computing infrastructure of claim 13, wherein the plurality of storage devices are configured to be in a loop in the fibre channel arbitrated loop system.

* * * * *